United States Patent Office 3,458,497
Patented July 29, 1969

3,458,497
PROCESS FOR PRODUCING RIBOFLAVIN DERIVATIVES
Ken Miyamoto, Matsudo-shi, and Yoshiya Takahashi, Koshigaya-shi, Japan, assignors to Tokyo Tanabe Co., Ltd., Tokyo, Japan
No Drawing. Filed Aug. 10, 1967, Ser. No. 659,594
Claims priority, application Japan, Dec. 17, 1966, 41/82,368
Int. Cl. C07d 57/32
U.S. Cl. 260—211.3         10 Claims

ABSTRACT OF THE DISCLOSURE

A two step process for preparing tetra-fatty acid esters of riboflavin by: (1) contacting a mixture of riboflavin, a fatty acid and a sulfonylchloride with a basic organic solvent to exothermically react said fatty acid with said sulfonylchloride while cooling said exothermic reaction and wherein the quantity of said basic solvent employed is insufficient to effect significant esterification of said riboflavin; and (2) after reaction of said fatty acid with the sulfonylchloride, contacting the reacted mixture with an additional quantity of basic organic solvent to obtain an exothermic reaction together with the formation of tetra-fatty acid esters of riboflavin.

---

According to the invention yield, purity and colour tone of the tetra-fatty acid esters of riboflavin formed are improved and the amounts of intermediates used in the process are reduced in comparison with the previously proposed processes.

The present invention relates to a process for producing riboflavin esters. In particular the present invention relates to a new process for producing tetra-fatty acid esters of riboflavin using inexpensive materials such as sulfonylchlorides, fatty acids and riboflavin.

The first object of the invention is to produce fatty acid esters of riboflavin which are readily soluble in fat and oil and various organic solvents, whereas riboflavin is not soluble therein; moreover, the fatty acid esters according to this invention have nutrient value as riboflavin.

The second object of the invention is to produce the said riboflavin derivatives by means of simple and facile operations.

The third object is to obtain the esters in greater yield and at higher purity and further to obtain the esters using smaller amounts of intermediates in comparison with the process known in the past.

Other purposes of the invention will be understood from the more detailed description of the invention that follows.

It is widely known that riboflavin is insoluble in fat and oil, sparingly soluble in water and has a bitter taste and it is these properties that give rise to difficulties in putting riboflavin to practical use as a medicament. These deleterious properties of riboflavin may be reduced by forming derivatives of the said compound.

Several processes for synthesizing riboflavin derivatives have hitherto been proposed and the tetra-fatty acid esters of riboflavin are considered to be some of the most suitable derivatives for this purpose. Thus, the tetra-fatty acid esters of riboflavin are soluble in fat and oil, readily soluble in various organic solvents and easily decomposed into riboflavin and fatty acid in vivo by pancreatic lipase and duodenal fluids.

The properties of these derivatives of riboflavin depend on the fatty acids with which the riboflavin is combined; for example riboflavin tetrabutyrate, not only shows properties as a medicament equal to those of riboflavin itself but also it may be used in the treatment of arteriosclerosis.

Previously proposed processes for producing fatty acid esters of riboflavin include a condensation process using acetic anhydride and pyridine (Kuhn et al., Berichte der Deutchen Chemischen Gesellschaft, 66, 1580; Karrer et al., Helvetica Chimica Acta, 18, 522) the process of reacting riboflavin with a fatty acid chloride in pyridine (Yagi et al., Vitamin (Kyoto), 21, 217 & 525), more recently the process of using a fatty acid anhydride and perchloric acid and in Japanese patent publication No. 3,548/1966 we have described a method of obtaining the fatty acid esters of riboflavin in high yield by a reaction involving the use of fatty acid anhydride and sulfuric acid.

The previously proposed processes have involved the use of such compounds as perchloric acid, which is a hazardous material to handle and expensive materials such as fatty acid anhydrides or chlorides. However, in Japanese patent publication No. 3,750/1966 (Chemical Abstracts, 65, 731c(1966)) we have described a method of obtaining tetra-fatty acid esters of riboflavin directly from such inexpensive materials as a fatty acid, a sulfonylchloride and a basic organic solvent for example pyridine.

We have now found that the tetra-fatty acid esters of riboflavin may be obtained in greater yields and at higher purity by a simple modification of the said process which we proposed latest.

According to the present invention, therefore, we provide a process for the production of tetra-fatty acid esters of riboflavin comprising dissolving or suspending a sulfonylchloride and riboflavin in a fatty acid and adding a basic organic solvent to this solution or suspension in two steps to cause two exothermic reactions in this process separately with a time lag.

The process of the present invention may be expressed by the following chemical reaction scheme:

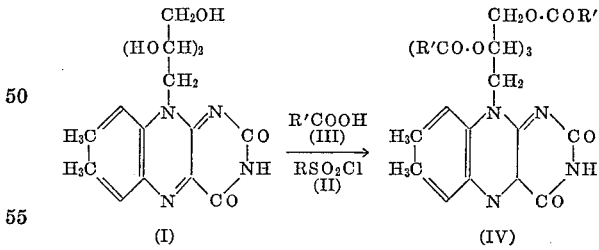

where R' represents an alkyl group and R represents an alkyl group, phenyl group, tolyl group or naphthyl group.

The process of the invention is carried out in the following manner; sulfonylchloride compound (II) and riboflavin (I) are dissolved or suspended in fatty acid (III), the amount of basic organic solvent required to convert the fatty acid into the fatty acid anhydride or chloride is added to the solution or suspension and thereafter the tetra-fatty acid esters (IV) are obtained by adding further basic solvent to promote the esterification of riboflavin.

We have found that in case where extremely an excessive amount over the theoretical amount of the intermediates, i.e., fatty acid, sulfonylchloride compound and pyridine are not used in the previous sulfonylchloride-pyridine process, the reaction does not progress favorably and yield and purity and color tone of riboflavin ester formed are lowered to a marked degree. With respect to this phenonmenon the reaction mechanism of the said process is believed to be as follows:

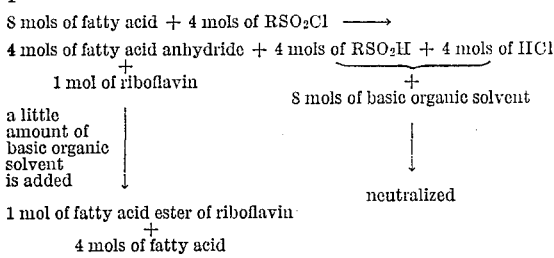

That is, this reaction progresses in the following two steps: The first step is a reaction, wherein fatty acid anhydride is derived from fatty acid and sulfonylchloride in the presence of basic organic solvent. The second step is a reaction, wherein fatty acid ester of riboflavin is derived from the fatty acid anhydride obtained in the first step and riboflavin in the presence of a basic solvent. Both of the said steps are exothermic reactions.

According to our previously proposed sulfonylchloride-pyridine process riboflavin is suspended in a mixed solution of fatty acid and pyridine, and a sulfonylchloride is added to this suspension. Therefore, the reaction sequence in this process is believed to be as follows in view of the said reaction mechanism:

The fatty acid anhydride is formed at the time of addition of sulfonylchloride and this anhydride and riboflavin are directly converted into the riboflavin ester by the catalytic action of the basic organic solvent that has been present from the beginning of the sulfonylchloride addition. In this process it is possible that the two exothermic reactions (anhydride-forming reaction and esterifying condensation reaction) occur simultaneously. Consequently, in spite of external cooling of the reaction system to the required temperature the riboflavin ester and other compounds formed by the reactions cannot be cooled enough locally and, as a result, yield and purity of the ester are reduced by this process. Moreover when the fatty acid in this reaction is a lower molecular weight compound it may act as a solvent, and any decrease in the amounts of fatty acid and pyridine result in increase of viscosity in the reaction system causing local insufficient cooling due to both of the exothermic reactions which result in lowering of yield, purity and color of the ester.

According to the present invention a sulfonylchloride is dissolved in fatty acid and riboflavin is suspended in this solution and the amount of basic organic solvent required is added to this suspension to complete the reaction of forming fatty acid anhydride or chloride in the first step. Then the esterification in the second step is promoted by adding slightly excessive basic organic solvent to this reaction system again and raising the temperature a little simultaneously.

The theoretical amounts of the materials to be used in the process according to the present invention are discussed in the above reaction mechanism though when a lower molecular weight fatty acid is used we prefer to use 10–11 mols of fatty acid per 1 mol of riboflavin as it may act as solvent in the reaction system. When a higher molecular weight fatty acid which is solid at normal temperature is used a little solvent, inactive to the reaction, may be used besides however this may cause difficulties in the after-treatment of the reaction product such as separation and recovery of the solvent and ester. Preferably the amount of sulfonylchloride used will be in slight excess of the theoretical amount, for example from 4.4 to 5.2 mols and the amount of basic organic solvent used in the first step is twice as much a molar quantity as the amount of sulfonylchloride used, i.e., from 8.8 to 10.4 mols, however, it is necessary to use a slightly excessive amount so as to raise esterification of riboflavin to some extent in this step. This aims to complete the formation of fatty acid anhydride in the first step while restricting the esterification as much as possible. If the amount of basic solvent which should be added afterwards, were added at the same time in the first step, the esterification would progress considerably (though not extensively unless temperature be raised), and the yield, purity and color tone of the ester which should be obtained in the second step would be lowered by the said local insufficient cooling of the reaction system.

The basic organic solvent added in the second step of the process according to the present invention acts as a catalyst for the esterification of riboflavin. The amount of the basic organic solvent used in the second step is preferably 4.0–6.0 mols per 1 mol of riboflavin.

The fatty acids used in the process according to the present invention are desirably those having two or more carbon atoms, and some of the preferred fatty acids include acetic acid, propionic acid, butyric acid, capric acid and palmitic acid and, since the melting points of these fatty acids rise gradually with increase in the number of carbon atoms, those having higher melting points are preferably dissolved in a suitable organic solvent inactive to the reaction. The fatty acids named above are inexpensive in comparison with fatty acid anhydrides or chlorides. This is because in general the latter compounds have to be synthesized from the former ones.

The sulfonylchloride compound used in the process according to the present invention may be represented by the formula: $RSO_2Cl$ where R represents an alkyl, phenyl, tolyl or naphthyl group and the sulfonylchloride compounds preferred for use in the present invention include methane sulfonylchloride, ethane sulfonylchloride, benzene sulfonylchloride, p-toluene sulfonylchloride and $\beta$-naphthalene sulfonylchloride. When the solution of the sulfonylchloride in the fatty acid is aided by warming, the anhydride forming reaction takes place later in the homogeneous phase as a liquid-liquid reaction. The fatty acid anhydride is not derived in this step yet.

The solution should be kept at such a temperature that the sulfonylchloride compound does not crystallize out, and riboflavin is added to this solution and stirred to form a suspension. Cooling the suspension to a suitable temperature the required amount of basic organic solvent is dropped into this suspension and, after completion of this addition, the suspension is stirred and cooled for scores of minutes at the said suitable temperature. The preferred basic organic solvents include pyridine, dimethylaniline and dimethylformamide. Fatty acid anhydride is formed from fatty acid and sulfonylchloride, and sulfonic acid and hydrochloric acid derived as by-products simultaneously are neutralized by the basic organic solvent in this step. As the basic organic solvent is used in an amount slightly in excess over that required for the said neutralization, slight esterification of the riboflavin suspended in the reaction system may occur due to the presence of the basic solvent. However, as the optimal temperature of the esterification is a little higher than that of the anhydride forming reaction, esterification is not significant. It is desirable in the anhydride forming reaction to maintain such a low temperature that the sulfonylchloride will barely crystallize out, however said reaction is preferably effected at a temperature in excess of about 50° C.

The further amount of basic solvent required to promote the esterification reaction in the second step may be added dropwise and the temperature of the system is preferably raised by from 10 to 40° C. with simultaneous stirring. When the esterification reaction is complete the solution becomes clear.

After completion of the reaction the solution may be poured into water or other solvent wherein the synthesized ester is less soluble, to crystallize out the fatty acid ester of riboflavin. The ester may be recrystallized from a suitable solvent and it is possible to achieve yields in excess of 95% of theoretical yield. Esters may be obtained having a purity close to 100% and a high quality of color.

The cost of the materials other than riboflavin used in the present invention may be reduced by ca. 40% compared with our previous invention.

The following examples serve to illustrate the invention without however limiting it:

Example 1

7.2 kg. of p-toluene sulfonylchloride and 7.5 kg. of n-butyric acid are heated to 60° C. in a 30 liter tank to completely dissolve the p-toluene sulfonylchloride. 3 kg. of riboflavin are added to this solution and then 7.5 kg. of pyridine are added little by little with stirring and maintaining a temperature of 50–60° C. After completion of the addition of pyridine, the liquid is kept at 60° C. for 50 minutes. A further 3 kg. of pyridine are added slowly and stirred for 2 hours at the temperature of 80–85° C. After the completion of the reaction the liquid is poured into 150 l. of water, allowed to stand over night and the precipitated crystals of the tetra-fatty acid ester of riboflavin are filtered and dried. The yield of crude crystal amounts to 5.13 kg. (98% of the theoretical amount). This is recrystallized from methanol and water to yield 5.04 kg. (96.5% of the theoretical amount). It has a melting point of 147–8° C., a purity of 100% by the method of determination described in the Japanese Standard of Food Additives and its color difference is L 74, a —3.0, and b 48.

The method for determining riboflavin tetra-butyrate described in the Japanese Standard of Food Additives is as follows:

After the sample is dried in a vacuum desiccator (sulfuric acid) for 4 hours, ca. 40 mg. of the dried sample is dissolved in ethanol and made up to 500 ml. with ethanol. 10 ml. is taken out of this 500 ml. and made up to 50 ml. with ethanol. The extinction ($A_1$) of the test liquid thus obtained is measured at a wave length of 445 m$\mu$ using a liquid layer having a thickness of 1 cm. with ethanol as control liquid. Standard crystal of the riboflavin that has been dried in the vacuum desiccator is further dried at 105° C. for 3 hours, thereafter 50 mg. of the dried crystal is dissolved in a mixture of 4 ml. of glacial acetic acid and 150 ml. of water by heating and the liquid is then cooled, made up to 500 ml. with water and 5 ml. of this solution is made up to 50 ml. with ethanol. The extinction ($A_2$) of this standard solution is measured in the same way as described above. From these $A_1$ and $A_2$ values the purity of the riboflavin tetra-butyrate ($C_{38}H_{44}O_{10}N_4$) is calculated by the following equation:

$$\frac{\frac{A_1}{A_2} \times (25 \times 1.745)}{\text{(wgt. of sample taken up)}} \times 100 \ (\%)$$

The color difference is measured by a color difference meter of the Japan Colour Machine Co., Ltd. L indicates the intensity of visible light to the eye, +a indicates redness, —a indicates greenness, +b indicates yellowness and —b indicates blueness.

Example 2

Example 1 is repeated except that 6.66 kg. of benzene sulfonylchloride are used in place of p-toluene sulfonylchloride and 5.21 kg. of acetic acid are used in place of the n-butyric acid. The yield of purified riboflavin tetra-acetate obtained is 3.91 kg. (90.0% of the theoretical amount) and the melting point of the crystal is 242° C. (decomp.).

Example 3

Example 2 is repeated except that 4.86 kg. of ethane sulfonylchloride are used in place of the benzene sulfonylchloride. The yield of purified riboflavin tetra-acetate obtained is 3.84 kg. (88.5% of the theoretical amount) and the melting point is 242° C. (decomp.).

Example 4

Example 1 is repeated except that 5.9 kg. of propionic acid are used in place of the n-butyric acid. The yield of purified riboflavin tetrapropionate obtained is 4.67 kg. (96.0% of the theoretical amount) and the melting point is 186–7° C.

Example 5

Example 4 is repeated except that 8.6 kg. of β-naphthalene sulfonylchloride are used in place of the p-toluene sulfonylchloride. The yield of purified riboflavin tetra-propionate obtained is 4.50 kg. (94.0% of the theoretical amount) and the melting point is 186–70 C.

Example 6

Example 3 is repeated except that 7.5 kg. of butyric acid are used in place of the acetic acid. The yield of purified riboflavin tetra-butyrate obtained is 5.10 kg. (97.4% of the theoretical amount) and the melting point is 147–8° C. (decomp.).

Example 7

Example 1 is repeated except that 25.6 kg. of palmitic acid are used in place of the n-butyric acid. (The acid anhydride in the first step is formed at 65° C.). The yield of purified riboflavin tetra-palmitate obtained is 7.98 kg. (83.6% of the theoretical amount) and the melting point is 78° C.

We claim:
1. A process for preparing tetra-fatty acid esters of riboflavin, which comprises:
   (A) contacting a mixture of riboflavin, a saturated monobasic fatty acid having two or more carbon atoms and a sulfonylchloride with a basic organic solvent to exothermically react said fatty acid with said sulfonylchloride while cooling said exothermic reaction and wherein the quantity of said solvent employed is in slight excess over twice the molar amount of said sulfonylchloride and insufficient to effect significant esterification of said riboflavin; and
   (B) after reaction of said fatty acid with said sulfonylchloride, contacting the reacted mixture with an additional quantity of a basic organic solvent to obtain an exothermic reaction together with the formation of tetra-fatty acid esters of riboflavin.

2. A process of claim 1 wherein: 4.4 to 5.2 mols of the sulfonylchloride and 8.8 to 10.4 mols of the fatty acid are contacted with 9.8 to 12.4 mols of the basic organic solvent, in the reaction of the fatty acid and sulfonylchloride, for each mol of riboflavin in the mixture; and said sulfonylchloride is of the formula $RSO_2Cl$ wherein R is alkyl, phenyl, tolyl or naphthyl.

3. A process of claim 2 wherein: the fatty acid is acetic acid, propionic acid, n-butyric acid, capric acid or palmitic acid; the sulfonylchloride is methane sulfonylchloride ethane sulfonylchloride, benzene sulfonylchloride, p-toluene sulfonylchloride or beta-naphthalene sulfonylchloride.

4. A process of claim 3 wherein from about 4.0 to 6.0 mols of the basic organic solvent, per mol of riboflavin are added after reaction of the fatty acid with the sulfonylchloride.

5. A process of claim 4 wherein the basic organic solvent is pyridine, dimethylaniline or dimethylformamide.

6. A process of claim 4 wherein the reaction of the sulfonylchloride and fatty acid is effected at a temperature above 50° C.

7. A process of claim 4 wherein the reaction of sulfonylchloride and fatty acid is maintained at a temperature range of about 50° C. to 60° C. and the reaction temperature for formation of the tetra-fatty acid esters is maintained at about 10° C. to 40° C. higher than the temperature for the reaction of the sulfonylchloride and fatty acid.

8. A process of claim 5, wherein the molar ratio of ingredients in the reaction of the sulfonylchloride and fatty acid is 10 to 11 mols of a fatty acid of lower molecular weight, 4.4 to 5.2 mols of the sulfonylchloride and 9.8 to 12.4 mols of the basic organic solvent per mol of riboflavin.

9. A process of claim 8 wherein the basic organic solvent is added dropwise with stirring for both the exothermic reaction step of (a) contacting said solvent with a mixture of riboflavin, a sulfonylchloride and a fatty acid, and (b) in the formation of the tetra-fatty acid esters.

10. A process of claim 9 wherein the reaction of the sulfonylchloride and fatty acid produces fatty acid anhydride.

References Cited

Miyamoto et al.: "Chem. Abst." vol. 65, July, 1966, p. 731(c).

LEWIS GOTTS, Primary Examiner

JOHNNIE R. BROWN, Assistant Examiner